United States Patent Office 3,554,929
Patented Jan. 12, 1971

3,554,929
HIGH SURFACE AREA ALUMINA COATINGS ON CATALYST SUPPORTS
Ralph Aarons, Wilmington, Del., assignor to E. I. du Pont de Nemours and Company, Wilmington, Del., a corporation of Delaware
No Drawing. Filed June 8, 1967, Ser. No. 644,488
Int. Cl. B01j *11/06, 11/32*
U.S. Cl. 252—462          6 Claims

ABSTRACT OF THE DISCLOSURE

Catalyst supports having low surface area are coated with an aqueous colloidal boehmite-activated alumina composition, dried, and then calcined at about 500° C., to obtain a high surface area coating. The coating composition can optionally contain catalytic material or these materials can be subsequently applied to form a complete catalyst.

BRIEF SUMMARY OF THE INVENTION

This invention relates to processes for applying high surface area coatings to catalyst supports. More particularly, this invention relates to processes for applying high surface area coatings to catalyst supports having low surface area by the use of a composition of colloidal boehmite and finely divided, activated alumina.

To be useful in many gas phase reactions, many catalyst supports require that a high surface area coating be deposited upon the surface of the support. This deposit or coating should be easy to apply durable, and free from cracking.

It has been difficult to apply these high surface area coatings to catalyst supports without the use of materials which will adversely affect the catalytic activity. This is particularly true of rugged catalyst supports which are usually very dense, non-porous and have smooth surfaces.

I have found that if very finely divided, active alumina particles are combined with colloidal boehmite in an aqueous medium, a slurry is obtained which can be easily applied to the catalyst support. This slurry upon being dried and calcined provides a hard, durable, high surface area coating which is uniform and strongly adherent to the support.

This high surface area coating can subsequently be impregnated with various catalytic materials by processes well known in the art.

In another aspect, the slurry can contain the desired catalytic material. The thus modified slurry is applied, dried and calcined in the same manner and results in a highly active catalyst product. This latter process is preferred in that it avoids an additional step of applying the catalytic material separately.

The process of the invention can also be used to apply high surface area coatings on porous catalyst supports; however, the real advantages of the process are realized when it is used to apply the high surface area coatings to supports having smooth surfaces of low surface area.

DETAILED DESCRIPTION OF THE INVENTION

The support material on which the high surface area coating is to be applied may be any type of support material, i.e., porous or not; however, the process of the invention is particularly suited for use with supports having smooth surfaces or low surface area. Exemplary of useful support materials are the following: glass, metals, fused alumina, fused silica, mullite, beryl, zirconia, zircon, porcelain, dense sintered alumina, chromia, spinel, magnesia, fused magnesia, and titania.

The size and the form of the support is immaterial and it can be orientated or unorientated, thus it can be in the form of a honeycomb or it could be in the form of pellets, random granules, spheres, corrugated shapes, bars, rods, tubes, rolls, spirals, screens, beads, coils, or any of the conventional shapes of the art.

Particularly preferred as support materials for use in this invention are thin-walled refractory ceramic structures which can be made by methods which have recently become known in the art. Such structures generally have a predetermined orderly shape, and are made up of ceramic sections ranging in thickness from say about 1 mil up to 250 mils or more. Examples of structures of this type are screens, tubes and tube bundles, plates, perforated sheets, and honeycombs. More complex and less common shapes are also contemplated since methods are now available for fabricating thin-walled ceramic structures in virtually any desired shape. These methods are described briefly below. No extended discussion is necessary since those skilled in the art are already familiar with the procedures.

U.S. Pat. 3,112,184 to Hollenbach describes a method for making thin-walled ceramic structures such as honeycomb. According to this method a suspension containing a finely divided sinterable ceramic material and a binding agent is applied to each side of a flexible carrier. The coated carrier is then molded into the desired shape and fired to sinter the ceramic. For example, in making honeycomb the coated carrier is corrugated and corrugated sheets are placed node to node or corrugated sheets are alternated with noncorrugated sheets to form a structure resembling a honeycomb. According to the disclosure, the carrier is preferably an organic fibrous material which will decompose under the conditions of sintering, but inorganic carriers which remain in the structure can also be used. Also according to the disclosure, this method can be used to produce ceramic structures of virtually any composition; examples include glasses such as borosilicates, soda-lime-silicates, lead-silicates, alumino silicates, refractories such as sillimanite magnesium silicate, magnesia, zircon, zirconia, petalite, spodumene, cordierite, corundum and the glass ceramics.

British Pat. 931,096, published July 10, 1963, discloses a similar method for making thin-walled ceramic articles. In this method, flexible sheets containing sinterable ceramic particles are formed then used to fabricate a structure of the desired shape. The assembly is then fired to sinter the ceramic particles and weld the sheets at points of contact. The sheets are made by mixing the ceramic particles with plasticizing ingredients such as organic polymers and forming the mix into thin films. The film is preferably formed on a carrier such as a thin metal foil which provides support during corrugation. After corrugation, the green film is removed from the support and is used in making a ceramic structure. The structure is then fired to sinter the ceramic particles. This method, according to the disclosure, is also applicable to a wide range of sinterable ceramic materials.

U.S. Pat. 3,255,027 to Talsma discloses a particularly suitable method for making the thin-walled ceramic structures useful as supports in the processes of this invention. In this method, aluminum foil is fabricated into a structure having the configuration of the desired final product and is fired under controlled conditions to oxidize the aluminum to alpha-alumina. Prior to the firing step aluminum is coated with a fluxing agent which serves to prevent inhibition of oxidation due to oxide scum formation on the surface of the aluminum. Examples of fluxing agents disclosed in the patent as being suitable include alkali metal and alkaline earth metal oxides and precursors of these oxides, i.e., compounds which yield the oxides on firing. A particularly suitable agent is sodium oxide which is applied as sodium silicate.

The ceramic products resulting from this process are substantially pure alpha-alumina. If desired, the chemical composition of the structures can be modified by including in the coating composition finely divided particles of filler refractory oxide. The filler refractories may, if desired, be one or more of those which will react with the alumina as it is formed. If a reactive filler, such as magnesia and/or silica is used, the honeycomb structure will contain the corresponding reaction product such as spinel, cordierite, or mullite. The products of this process are characterized by outstanding strength and thermol shock resistance.

As disclosed in the Talsma patent, honeycomb structures may be fabricated by corrugating sheets of aluminum coated with fluxing agent and placing the coated sheets together node to node. Where sodium silicate solution is used as the fluxing agent, the body will have sufficient green strength to maintain its shape until it is fired. Alternatively, the honeycomb structure may first be fabricated from the aluminum foil using methods well known in the art and described in the patent literature. Reference is made to U.S. Pats. 2,610,934, 2,674,295, and 2,734,843 for teachings concerning the art of making honeycomb. Structures with nominal cell sizes ranging from 1/8" to 3/4" and foil thicknesses of 0.7 mil to 7 mils are readily available. Other sizes with cells ranging from say 1/32" up to 2" or higher and with foil up to 1/4" in thickness can be made and used in the process disclosed in the Talsma patent. The preferred structures are prepared using foil of about 2 mils thick.

An improvement in the process for making ceramic structures by the method of the Talsma patent is disclosed in co-pending U.S. application Ser. No. 367,856, filed May 15, 1964. In the process of this application the composition used to coat the aluminum template structure contains, in addition to the fluxing agent and filler refractory if any, small amounts of a vanadium compound. The products of the Talsma patent are characterized by having a double-walled structure. The double wall results from the fact that the aluminum foil, as it melts, flows outwardly through the oxide film formed on the outer surfaces of the foil and is oxidized at the outer surface of the oxide layer, thus leaving a large void in the final product corresponding approximately in thickness to the thickness of the original aluminum section. The inclusion of the vanadium compound in the coating composition causes the formation of bridges of refractory material between these double walls resulting in a product having even greater strength and thermal shock resistance than the products of the Talsma patent.

A further improvement in the process of the Talsma patent is disclosed in co-pending U.S. application Ser. No. 471,738, filed July 13, 1965 now U.S. Pat. 3,473,987. In the process of this application the composition used to coat the aluminum template structure contains aluminum powder in addition to the fluxing agent and filler refractory, if any. The aluminum powder, of course, is oxidized to alumina during firing along with the aluminum in the original metal template. This method provides structures which are similar to those of the Talsma patent in that they are double-walled, but the walls can be made much thicker than the central void. Thus the products are stronger than those of the Talsma patent.

A particularly preferred method for making catalyst support structures is disclosed in co-pending application Ser. No. 449,629, filed Apr. 20, 1965. The method is similar to that disclosed in Ser. No. 471,738, but silicon carbide is added to the composition used to coat the aluminum metal template. Upon firing, the silicon carbide reacts with the aluminum to provide mullite. Mullite structures are particularly preferred as catalyst carriers because of their high strength and low thermal expansion.

A further suitable method for making thin-walled ceramic structures is disclosed in co-pending application Ser. No. 336,983, filed Jan. 10, 1964 now U.S. Pat. 3,338,995. In this method a "fugitive" material, e.g., paper, is coated with a composition including aluminum powder, a binder, a fluxing agent (of the type disclosed in the Talsma patent), and a liquid carrier. The "fugitive material" may be first coated then used to fabricate a honeycomb or similar structure or the honeycomb may be first fabricated from the fugitive material then coated. In either case, the coated structure is fired in an oxygen-containing atmosphere to burn out the fugitive material and oxidize the aluminum. Filler refractories can of course be included in the coating compositions to provide ceramics including compounds and/or solid solutions of alumina with other oxides.

Any high surface area, finely divided active alumina can be used in the process of the invention. These active alumina particles are characterized in that their surface area will range from 50 $m.^2/g.$ to 600 $m.^2/g.$ Preferred materials will range between 180 $m.^2/g.$ and 250 $m.^2/g.$ These particles will range in particle size from 8 to 60 microns and preferably on the order of 30 to 40 microns.

When referring to the surface area of the active alumina, this surface area can be measured by nitrogen absorption as described in "A New Method for Measuring the Surface Area of Finely Divided Materials and for Determining the Size of Particles" by P. H. Emmett in the publication "Symposium on New Methods for Particle Size Determination in the Sub-Sieve Range," published by the American Society for Testing Materials, Mar. 4, 1941, p. 95.

Activated alumina particles are commercially available. Thus, suitable for use in the process of the invention are such commercial activated alumina as:

Alcoa F–1 which is an alumina hydrate having 1 mole alumina per 1/2 mole of water and an average particle diameter between 30 and 40 microns.

Alcoa C–333 which is alumina trihydrate having an average particle size of about 8 microns and over 95% of the particles less than 44 microns.

To be useful in the process of the invention, some commercially available active aluminas should be washed free of salts. The presence of small amounts of salt can create problems in that settling occurs in the slurry, thus making a uniform coating difficult to obtain.

Further, in some embodiments of the invention, the activated alumina should be contacted with acid in order to acidify the alumina particles. This is necessary in that the particles should be in a pH range which is compatible with the colloidal boehmite used. Thus when the colloidal boehmite used consists of minute fibrils of boehmite, the activated alumina when mixed with this fibrous boehmite should have a pH such that the mixture pH is in the range of 3.0–4.5 with a preferred range of 3.5 to 4.0. It is found that when the pH of this mixture is outside of this range, settling or gelatin can occur.

The activated alumina particles are then mixed with colloidal alumina monohydrate, conventionally known in the art as colloidal boehmite. The colloidal boehmite acts as a bonding precurser in that during the subsequent drying and calcining of the coating, the activated alumina particles are bonded together and to the support by the action of heat upon the colloidal boehmite.

In general, once the coating has been applied, dried and calcined, the colloidal boehmite will compose 5% to 10% and generally around 6% of the content of the dry coating. The active alumina particles will comprise up to about 95% and generally around 90% of the dried coating.

The colloidal boehmites useful in the process of the invention are composed of discrete particles having one or more dimensions in the colloidal range, i.e., below 200 millimicrons. A particularly useful colloidal boehmite is a monohydrate alumina having 30% or more of its particles in the form of fibers. Exemplary of this material is "Baymal" colloidal alumina. The physical and chemical properties of "Baymal" colloidal alumina and its method of preparation are disclosed in U.S. Pat. 2,915,475. This disclosure is incorporated herein by reference.

The boehmite need not initially be in the colloidal range. Larger particles of boehmite can be used provided that they are peptized into the colloidal range prior to being applied to the support.

Other colloidal boehmites which can be used in the process of the invention are the alumina hydrates made by the processes set out in U.S. Pat. Armbrust et. al. 3,268,295 and Gring et al. U.S. Pat. 3,245,919.

As previously set forth, the active alumina can be acid washed prior to being incorporated in the coating composition. This is usually accomplished by washing the active alumina in a suitable acid such as sulfuric, hydrochloric, acetic or nitric acid at a pH of 3.5 to 4.0. The alumina is then recovered from the aqueous solution by filtration or decanting and is dispersed into the colloidal boehmite as a wet, i.e., 40% by weight moisture, acid-containing cake.

The coating composition is then made by dispersing the colloidal boehmite in water to yield a sol of the ultimate particles; other than water some highly polar solvents cen be used, but their use is not preferred. To the sol is then added, with sufficent agitation, the finely divided active alumina. The agitation is continued until the composition is homogeneous.

When using fibrous boehmite, the concentration of the boehmite in the water should be sufficient to develop thixotropy, thus preventing the active alumina particles from settling.

The support is then coated by any convenient method, e.g., by immersion in the slurry. The support is then removed from the slurry and the excess drained. The coated support is then dried and calcined at about 500° C., preferably 400 to 500° C. The dripping process and drying steps can be repeated until the desired thickness of the coating is obtained. Under most conditions, one coating will be sufficient; however, depending upon the end use, two or three coatings may be desired.

As indicated above, the catalytic material can then be applied to the coated support. Application of the catalytic material to be coated substrate is accomplished by conventional methods for making supported catalysts. The amount of catalystic material applied is not critical and is dependent upon the ultimate use of the catalyst.

The methods to be used are so well known that no extended discussion will be necessary to an understanding of the invention. In general, the method used will entail immersing the coated support structure in a water solution of a soluble compound of the catalytic metal and adding a precipitant, thereby causing an insoluble compound of the metal to precipitate onto the support. The precipitants which can be used include the soluble carbonates, hydroxide, oxalates, chromates, and the like. For example, a coated honeycomb can be immersed in a solution of nickel nitrate in water and a precipitant such as amonium carbonate can be added to precipitate nickel carbonate onto the support. The catalyst can then be dried and calcined to decompose the carbonate, leaving the catalytically active nickel oxide. Similarly, the support structure can be immersed, for example, in a water solution of chromium anhydride and manganese nitrate and ammonia can be added to precipitate a mangano-chromia-manganite catalyst. Again, the support can be impregnated by immersion in a solution of a precious metal salt. The impregnated support can then be treated with a reducing agent such as formaldehyde, ethanol, or hydrogen to reduce the precious metal to the elemental form. As another example, a coated ceramic honeycomb can be impregnated by immersion in a water solution of ammonium metavanadate and the impregnated support can be dried and calcined to convert the vanadate to catalytically active vanadium pentoxide. Where it is not convenient to immerse the coated support in a solution or slurry of catalytic material, the catalyst can, of course, be sprayed or brushed onto the surface. Applications of these conventional methods to preparation of supported catalysts in the scope of this invention are further illustrated in the examples below.

As also indicated above, the catalytic material can be applied simultaneously with the high surface area coating to the support. Thus any catalytic material can be added to the slurry as long as it does not result in settling. Thus when a fibrous boehmite is present in the slurry, the catalytic material should not alter the pH of the composition out of the pH 3.5 to 4.0 range.

The simultaneous application can be accomplished simply by mixing in the slurry a solution of a soluble compound of a catalytic metal and applying the mixture by dipping brushing or spraying to the support, followed by drying and calcining to dry off any of the remaining moisture and to convert decomposible compounds to the catalytically active oxides. For examples, to the slurry can be added, with agitation, a solution of ammonium metavanadate and the mixture can be applied to a ceramic honeycomb. Subsequent drying and calcining converts the metavanadate to catalytically active vanadium pentoxide.

Alternatively, a slurry of an insoluble catalytic material in very finely divided form can be mixed with the slurry and this mixture can be applied to the support structure. In this method, the solid catalyst particles should be substantially all of a size which will pass a 20 mesh screen. For maximum catalytic activity per unit weight of catalyst, it is preferred that the catalyst particles be substantially all of a size which will pass a 325 mesh screen. Another reason for preferring smaller particles is that they are easier to make adhere to the support. Expressed otherwise, the particles should be less than about 800 microns and preferably less than about 45 microns. There is actually no lower limit on the particle size of the solid insoluble catalytic material which can be used. Ordinarily, however, particles of at least 0.5 micron will be used.

Preparation of catalysts of this invention by simultaneous deposition of high surface area coating and catalytic material is further illustrated by the examples below.

The catalytic material which can be employed in the process of the invention, either for simultaneous or subsequent application, include all of the solid inorganic materials, used as such. Thus there can be used the oxides, cerates, chromates, chromites, manganates, manganites, molybdates, tungstates, stannates, ferrites and vanadates of such metals as iron, cobalt, nickel, zinc, palladium, platinum, ruthenium, rhodium, manganese, chromium, copper, cadmium, silver, calcium, barium, mercury, tin, lead, molybdenum, tungsten, and the rare earths. The precious metals such as ruthenium, rhodium, palladium, and platinum can of course also be used in elemental form and this is preferred when these materials are to be incorporated in the slurry. Compounds of the catalytic metals which decompose upon heating to provide the oxides can of course also be used. These include the hydroxides, carbonates, nitrates, and organic salts of the various metals, as well as ammonium salts such as ammonium metavanadate and ammonium molybdate.

Other materials besides those already mentioned can be included in the coatings for specific applications. Catalyst promoters and/or fluxing agents can sometimes advantageously be included in the catalytic coatings. For example, a supported catalyst for axidation of $SO_2$ to $SO_3$ made up of ammonium metavanadate and the alumina-boehmite composition of the invention deposited on a ceramic honeycomb preferably will also have both a promoter and a fluxing agent in the coating. The purpose of the fluxing agent is to lower the melting point of the vanadia catalyst so that it is liquid at the temperature of the $SO_2$ reaction, which is around 600° C.

Examples of catalyst promoters which can be used are the compounds of the transition metals and the rare earth metals, especially compounds, e.g., mineral salts and oxides, of iron, cobalt, nickel, manganese, ruthenium, rhodium, palladium, and platinum. Fluxing agents which can be used are in general salts of alkali metals, particularly sodium, potassium, and lithium. Of course the promoter compound and fluxing agent of choice will depend upon the ultimate application contemplated for the catalyst. For vanadia catalysts intended for use in oxidation of $SO_2$, it is of course preferred to use sulfates or salts (e.g., carbonates) of the promoter metals and alkali metals which decompose with subsequent formation of sulfates. Alkali metal halides, which are otherwise commonly used as fluxing agents, are not suitable in this application because of their corrosiveness in the system.

Proportions of ingredients in the catalysts made by the process of this invention can vary widely depending upon the application. In general, the ratio of the weight of the catalytic coating, i.e., high surface area coating composition containing catalytic materials, to the weight of the support material will be in the range of about 0.01:1 to 10:1. Lower amounts of this coating ordinarily do not provide adequate catalyst and in fact a ratio of 0.01:1 will ordinarily not provide sufficient catalytic activity unless the proportion of catalyst in the coating is high. Especially where substantial proportions of ingredients other than catalyst are present in the coating it will ordinarily be desirable to use at least 0.1 part coating per part of support.

Higher ratios above 10:1 are ordinarily merely wasteful of catalyst. Moreover, the upper limit of the ratio of catalyst coating to support is ordinarily limited by the shape of the support and the characteristics required of the final product. For example, in the case of a catalyst coated ceramic honeycomb it is ordinarily desired that the catalyst system present as much open area as possible in order to minimize pressure drop through the catalyst. Certainly the amount of coating should not be so great as to close the honeycomb cells.

The preferred range of ratios of coating weight to support weight will ordinarily be between 0.05:1 and 2:1. The optimum ratio of any given catalyst-support combination and for any particular application can be readily determined by simple experimentation.

The above generalizations are of course meaningful only where the support is a relatively light-weight structure such as thin-walled glass or metal tubes or ceramic honeycombs. It is to be understood that the method of this invention is equally applicable to putting a catalytic coating on surfaces of massive heavy structures such as the exterior of tubes in a tube bundle of a heat exchanger, and in this event the weight of the catalyst coating will be extremely minute in comparison to the weight of the support material. It is thus perhaps more meaningful to say that the amount of coating composition deposited on the impervious substrate should be sufficient to provide a continuous film between about 0.1 mil and $\frac{1}{16}$ inch in thickness, and preferably, between about 1 and 25 mils in thickness.

In the coating composition containing catalytic material, the amount of catalyst can vary from as little as 1% to as much as 90% by weight of the coating. If a fluxing agent is used, it can make up as much as 50% of the coating. The addition of less than 1% fluxing agent is ordinarily not worthwhile and little benefit is gained by having more than 50% present. A promoter, if used, can constitute 90% of the coating, but ordinarily amounts between 0.5 and 10% will be used.

It is to be understood that the invention of this application is in the nature of the components of the supported catalyst, and not in the relative proportions. The above figures and examples below are given for the guidance of those wishing to practice the invention. The proportions can vary widely. With this information, those skilled in the art will have no difficulty in determining the optimum proportions of ingredients for a given application.

The invention will be illustrated by the following examples:

EXAMPLE 1

An alumina honeycomb is prepared in the following manner. An aluminum honeycomb in the shape of a square parallelepiped having the dimensions 4" x 6" x ½" with the honeycomb cell axis perpendicular to the 4" x 6" base is etched by immersion in a 1% solution of sodium hydroxide for 3 minutes. The nominal diameter of the thus-etched honeycomb cells is ⅛ of an inch, and the honeycomb is made of aluminum alloy 5052 (2.5 magnesium) having a thickness of 0.0002 inch.

A composition is made of:

1 lb. of a 1% solution of carboxy methylcellulose
1 lb. 41° Bé. sodium silicate solution ($Na_2O:SiO_2$ ratio of 1:3.25)
½ lb. of —200 mesh aluminum powder
1 lb. —200 mesh hydrated aluminum oxide powder
1½ lb. of green silicon carbide, approximately 325 mesh
½ lb. of —50 mesh bonding clay
250 cc. water.

The aluminum honeycomb is dipped into this composition, drained and air dried. The coated honeycomb is then pressed at 5 p.s.i. between platens heated to 150° C. for 3 minutes. From the heat set honeycomb, cylinders $\frac{5}{16}$" diameter x ½" long with the longitudinal axis of the honeycomb cells parallel to the axis of the cylinder are cut by die-cutting. These cylinders are then coated a second time by immersing in the slurry above, drained and air dried.

The coated honeycomb cells are placed into a glass-lined furnace and fired to 1580° C. over a 5-day period according to the following schedule:

50° C. to 800° C. at 8 hours
800° C. to 1000° C. at 24 hours
1000° C. to 1250° C. at 24 hours
1250° C. to 1380° C. at 24 hours
1380° C. to 1430° C. in 24 hours
1430° C. to 1580° C. in 18 hours The furnace is then cooled to room temperature over a period of 48 hours and the structure is removed.

The fired ceramic structure corresponds closely in shape and size to the original aluminum honeycomb. X-ray analysis of a sample of the product shows that the structure is predominately mullite with a substantial amount of crystalline alumina and a small amount of amorphous material.

To an aqueous gel of colloidal boehmite containing 15% solids is added acid washed active alumina. The boehmite used is "Baymal" colloidal fibrous boehmite made by the process disclosed in U.S. Pat. 2,915,475. The resulting slurry is about 7% "Baymal" colloidal fibrous boehmite.

"Baymal" colloidal boehmite is a white, free flowing powder consisting of substrates of minute fibers of boehmite (AlOOH alumina). The powder disperses readily in water to yield sols of the ultimate fibrils.

The active alumina used is Alcoa F-1 having a maximum particle size of 44 microns with an average particle size between 30 and 40 microns, i.e., this material will pass a 325 mesh screen.

Prior to being added to the colloidal boehmite, the active alumina is washed by dispersing in an aqueous solution of nitric acid at about a pH of 3.5 to 4.0. The alumina is recovered by filtration and dispersed as the wet (40% by weight moisture) acid containing cake in the "Baymal" gel.

The alumina honeycomb is coated by immersing in the fibrous boehmite-alumina slurry. The alumina honeycomb is then removed from the slurry and the excess dried. The coated honeycomb is then dried and further calcined at about 500° C. The dipping process is repeated as necessary until the desired thickness of the coating is obtained.

The alumina honeycomb originally exhibited a surface area from 0.05 to 0.4 square meter per gram. After the above treatment, the coated ceramic honeycomb exhibits a specific surface area of 10 or more square meters per gram.

Instead of the Alcoa F-1 alumina used above, Alcoa C-333 alumina hydrate could be used. This alumina is a commercially available alumina trihydrate having the chemical formula $Al_2O_3 \cdot 3H_2O$ and having an average particle size of 8 microns and 95 to 97% of the particles of less than 44 microns in size.

In another experiment, 2% by solid weight of finely divided platinum diamino dinitrite is added to the fibrous boehmite-alumina slurry. The alumina honeycomb is coated with this slurry, calcined and reduced. The resulting catalytic structure is useful for the oxidation of hydrocarbon fumes and reduction of nitrogen oxides in gas streams.

EXAMPLE 2

A sample of microcrystalline boehmite prepared according to the procedures of U.S. Pat. 3,245,919 is ball milled for three days with water adjusted to pH 3.8 with nitric acid. A paste of 12.6 percent by weight of colloidal boehmite results. The colloidal boehmite is characterized by X-ray analysis showing boehmite and also by the stability of a sol prepared by diluting a portion of the paste with 10 parts by weight of water adjusted to pH 4.0.

A 200 g. sample of −325 mesh Reynolds Metals Company RA-1 activated alumina is suspended in 200 ml. of water and adjusted to pH 4.1 with a few drops of nitric acid. This resulting suspension is mixed with 103 g. of the boehmite paste.

Several alumina and mullite honeycombs were coated with the mixture by dipping; the coated honeycombs are then dried and calcined for two hours at 460° C. The coatings range from 8 percent to 26 percent by weight of the weight of the honeycomb. The surface area of the coating, as measured by nitrogen adsorption, is 218 m.$^2$/g.

A solution of platinum tetramine dinitrite adjusted to pH 10 with ammonium hydroxide is prepared to contain 1 percent platinum. The coated honeycomb is dipped in this solution, removed, dried, calcined for 30 minutes at 300° C. and reduced. X-ray analysis shows that a very finely divided platinum metal is deposited on the active alumina coating. This product shows good catalytic activity in oxidizing heptane in air at 300° C.

EXAMPLE 3

A platinum solution is prepared by adding concentrated nitric acid to chloroplatinic acid and evaporating to dryness on a hot plate. This step is repeated three times and the product is dissolved in water to yield a 10% platinum solution. The pH of this solution is adjusted to pH 3.2 with nitric acid.

The platinum solution is added to a coating solution, prepared as in Example 2, to give 2.5% platinum based on the total solids in the composition.

Samples of ceramic pellets and rods are treated by dip-coating them in the composition, drying and calcining at 400° C. The coated samples turn uniformly gray after several minutes in a gas-rich flame and show good catalytic activity in continuing to catalyze oxidation of the gas mixture when the flame is blown out.

Samples of ceramic honeycomb are coated in a similar manner and reduced in the gas-rich flame. These averaged 10% coating pick-up based on honeycomb weight and show an excellent activity in hydrocarbon oxidation with both air and nitrogen oxides.

EXAMPLE 4

A sample of boehmite prepared according to U.S. Pat. 3,268,295 is prepared as a 13.4 percent paste by the procedure of Example 2.

The paste is used to prepare a coating composition with Alcoa F-1 active alumina. The composition is coated on a ceramic honeycomb and after calcining, the coating is impregnated with cobalt, nickel, and palladium nitrate solutions, respectively.

Other ceramic honeycomb samples are coated after adding about 5 percent of these metals, as nitrates, to the coating composition.

All of the samples are calcined and then hydrogen reduced at 250° C. They all show good catalytic activity in shaker-tube hydrogenations of organic nitriles to amines.

EXAMPLE 5

An alumina honeycomb is coated with a fibrous boehmite-alumina slurry as set forth in Example 1.

An aqueous solution of chloroplatinic acid is prepared equivalent to 1% platinum. The alumina honeycomb is immersed in the chloroplatinic acid solution until it is completely wet. It is thereafter drained and then is placed in a closed, heated vessel, except for gas inlet at one end and outlet at the other which permit hydrogen to be passed over the coated and platinum-impregnated honeycomb. Humidified hydrogen is passed through the vessel and over the coated and impregnated honeycomb at temperatures ranging from 70° C. to a final temperature of 250° C. The hydrogen is humidified by bubbling it through water at 70° C. The platinum is thereby reduced and activated. A catalyst so prepared is effective in oxidation reactions such as the oxidation of carbon monoxide to carbon dioxide, hydrogen to water, and for the reduction of nitrogen oxides with appropriate reducing gases to produce hydrocyanic acid or to produce complete combustion and to produce harmless and deodorized gases. Furthermore, it can be used for hydrogenations such as the hydrogenation of acetylene to ethylene in the presence of excess ethylene. Additionally, it can be used for hydrogenations of benzene to cyclohexane or nitriles such as adiponitrile to hexamethylenediamine or aldehydes such as butyraldehyde to butyl alcohol.

Instead of the platinum specified above, there can be used an equal weight of palladium or a 50:50 mixture of platinum and palladium or rhodium and palladium or rhodum and platinum or ruthenium or ruthenium and rhodium. These catalysts also have activity for those reactions enumerated.

What is claimed is:

1. A process for applying uniform, high surface area active alumina coatings to catalyst supports comprising preparing an aqueous composition consisting essentially of colloidal boehmite with finely divided, high surface area alumina particles having a particle size ranging from 8 to 60 microns and a surface area which ranges from 50 m.$^2$/g. to 600 m.$^2$/g., applying such composition to the catalyst support and heating to temperatures of about 400° C. to 500° C. to obtain a dry coating of 5 to 10% by weight colloidal boehmite and 90 to 95% by weight of active alumina particles.

2. A process for making a supported catalyst comprising preparing an aqueous composition consisting essentially of colloidal boehmite with finely divided, high surface area alumina particles having a particle size ranging from 8 to 60 microns and a surface area which ranges from 50 m.$^2$/g. to 600 m.$^2$/g., applying such composition to the catalyst support and heating to temperatures of about 400° C. to 500° C. to obtain a dry coating of 5 to 10% by weight colloidal boehmite and 90 to 95% by weight of active alumina particles, and subsequently impregnating the dry coating with a catalytic material selected from the group consisting of the oxides, cerates, chromates, chromites, manganates, manganites, molybdates, tungstates, stannates, ferrites and vanadates of iron, cobalt, nickel, zinc, palladium, platinum, ruthenium, rhodium, manganese, chromium, copper, cadmium, silver, calcium, barium, mercury, tin, lead, molybdenum, tungsten and the rare earths, and elemental ruthenium, rhodium, palladium, or platinum.

3. A process for making a supported catalyst comprising preparing an aqueous composition consisting essentially of a catalytic amount of a catalytic material selected from the group consisting of the oxides, cerates, chromates, chromites, manganates, manganites, molybdates, tungstates, stannates, ferrites, and vanadates of iron, cobalt, nickel, zinc, palladium, platinum, ruthenium, rhodium, manganese, chromium, copper, cadminum, silver, calcium, barium, mercury, tin, lead, molybdenum, tungsten, ruthenium, iridum and the rare earths; precursors of the oxides; and elemental ruthenium, rhodium, palladium or platinum; with colloidal boehmite and finely divided, high surface area alumina particles having a particle size ranging from 8 to 60 microns and a surface area which ranges from 50 m.²/g. to 600 m.²/g., applying such composition to the catalyst support and heating to temperatures of about 400° C. to 500° C.

4. The process of claim 1 wherein the surface area of the alumina ranges from 180 m.²/g. to 250 m.²/g.

5. The process as described in claim 1 where the alumina is characterized in that it has been acid washed such that when combined with the colloidal boehmite, the mixture as a pH in the range of 3.5 to 4.0.

6. The process of claim 1 wherein the support is a mullite honeycomb made by the in situ oxidation of aluminum coated with a fluxing agent and silicon carbide.

References Cited

UNITED STATES PATENTS

| 3,264,228 | 8/1966 | Burbidge | 252—463 |
| 3,317,277 | 5/1967 | Cosgrove | 23—143 |
| 2,952,644 | 9/1960 | Holden | 252—465 |
| 3,377,265 | 4/1968 | Caesar | 204—290 |
| 3,255,027 | 6/1966 | Talsma | 106—65 |

DANIEL E. WYMAN, Primary Examiner

P. M. FRENCH, Assistant Examiner

U.S. Cl. X.R.

252—463, 464, 465, 466, 467, 468, 469, 470, 471, 472, 473, 474, 475, 476, 477